United States Patent [19]

Feldmaier

[11] Patent Number: 4,842,301
[45] Date of Patent: Jun. 27, 1989

[54] ACOUSTIC EMISSION AUTOMOTIVE CRASH SENSOR

[75] Inventor: Douglas A. Feldmaier, Birmingham, Mich.

[73] Assignee: General Motors Corporation, Detroit, Mich.

[21] Appl. No.: 239,900

[22] Filed: Sep. 2, 1988

[51] Int. Cl.$^4$ .............................................. B60R 21/08
[52] U.S. Cl. ..................................... 280/735; 180/274
[58] Field of Search ................. 280/734, 735; 180/274

[56] References Cited

U.S. PATENT DOCUMENTS

| 4,021,057 | 5/1977 | Held et al. | 280/735 |
| 4,059,822 | 11/1977 | Toshioka et al. | 280/735 |
| 4,087,782 | 5/1978 | Oishi et al. | 280/735 |
| 4,346,914 | 8/1982 | Livers et al. | 280/735 |
| 4,504,082 | 3/1985 | Brown, Jr. et al. | 280/735 |

Primary Examiner—Kenneth R. Rice
Attorney, Agent, or Firm—Robert M. Sigler

[57] ABSTRACT

A crash sensing and occupant restraint activating apparatus is disclosed for a vehicle having a welded unit body structure including a side rail extending back from the front of the vehicle on each side. An acoustic sensor near the front of each side rail generates a signal in response to acoustic vibrations due to metal deformation in a frontal crash. The signals from the sensors are processed through a bandpass filter and an envelope detector. A comparator/timer generates a crash signal to activate an occupant restraint only when the envelope of the filtered sensor signal exceeds a predetermined amplitude reference for a predetermined time period of substantially 5 milliseconds. The envelope detector has a time constant of substantially 2 milliseconds; and the bandpass filter passes 200 to 300 KHz.

8 Claims, 5 Drawing Sheets

ACOUSTIC EMISSION AUTOMOTIVE CRASH SENSOR

BACKGROUND OF THE INVENTION

This invention relates to an acoustic emission automotive crash sensor arrangement for sensing the acoustic emissions of a crash caused deformation of vehicle structure and generating a crash signal to activate an occupant restraint if the acoustic emissions meet particular criteria.

The use of acoustic emissions for crash sensing was disclosed in U.S. Pat. No. 4,346,914, issued to Gerald D. Livers et al on Aug. 31, 1982. In the system disclosed in that patent, a continuous loop type wave guide is welded to the vehicle front structure at a plurality of points so as to conduct acoustic emissions from the structure to one or more acoustic sensors located on the vehicle firewall. The sensor output is compared with a preprogrammed threshold for one or more parameters of the acoustic emission event to determine whether the event is the product of an impact of severity sufficient to require activation of an occupant restraint.

The waveguides of the Livers et al system, however, can add additional cost and weight to the vehicle and complexity to the vehicle engine compartment. It would be desirable to sense the acoustic emissions from vehicle structural deformation without such waveguides in such a way as to reliably determine the necessity for activation of an occupant restraint. In addition, it would be desirable to determine the precise criteria for which such a signal should activate an occupant restraint and for which it should not so activate it.

The majority of today's vehicles are built with unit body construction, wherein the major parts of the vehicle structure are welded together. Thus, the waveguides are not necessarily needed in such vehicles to allow communication of acoustic emissions from a deformation near the front of the vehicle to a sensor located on the vehicle structure, if the locations of the sensor or sensors are chosen correctly and if a crash sensing algorithm can be discovered which accurately distinguishes between those acoustic emission events for which occupant restraint activation is desired and those for which it is not in response to a signal from the sensor(s).

SUMMARY OF THE INVENTION

This invention is thus an apparatus for sensing a vehicle crash for which activation of an occupant restraint activation is desired and activating the occupant restraint, the signal being derived from the sensing of acoustic emissions from deformation of the vehicle body structure by means of one or more acoustic emission sensors mounted in sensing arrangement directly on the vehicle structure without the use of added acoustic waveguides, and the signal being processed according to predetermined criteria to determine whether or not to activate the occupant restraint.

More particularly, the invention is used in combination with a vehicle having a welded unit body structure including a pair of frame side rails, one on each side of the vehicle extending longitudinally back from the front of the body structure, the structure further being of the type which emits an acoustic signal upon deformation thereof in a crash which is transmitted to at least one of the side rails.

The invention comprises an acoustic sensor attached to each side rail near the front thereof. The invention further comprises a bandpass filter effective to pass a signal from either acoustic sensor in a predetermined high frequency range and an envelope detector with a predetermined time constant responsive to the bandpass filter output to derive an envelope thereof. The invention further comprises comparator/timer means effective to compare the output of the envelope detector with a predetermined reference amplitude and generate a crash signal when the reference is exceeded for a predetermined minimum time and means responsive to the crash signal for activating an occupant restraint.

The crash detection criterion wherein an envelope of the filtered sensor output must exceed a predetermined amplitude reference for a minimum time is effective to distinguish a frontal crash from such other acoustic emission events as various rough road tire impacts such as severe potholes or railroad crossings, hammer blows directly to the side rail or other body parts, and minor collisions, such as a simulated deer collision, when the parameters of minimum time, reference amplitude, envelope detector time constant and filter frequency range are chosen correctly. One sensor on each side rail is sufficient for most vehicles. The predetermined minimum time for which the envelope of the filtered signal must exceed the amplitude reference is preferably substantially 5 milliseconds, with the amplitude reference chosen with regard to the gain of the sensor and sensor electronics. The predetermined time constant of the envelope detector is preferably substantially 2 milliseconds. The predetermined high frequency range is preferably substantially 200 to 300 KHz. The apparatus provides a reliable sensing of a vehicle frontal crash with activation of an occupant restraint and distinguishes such an event from typical acoustic emission events not requiring occupant restraint activation. Further details and advantages will be apparent from the accompanying drawings and following description of a preferred embodiment.

DESCRIPTION OF THE PREFERRED EMBODIMENT

Figure 1:
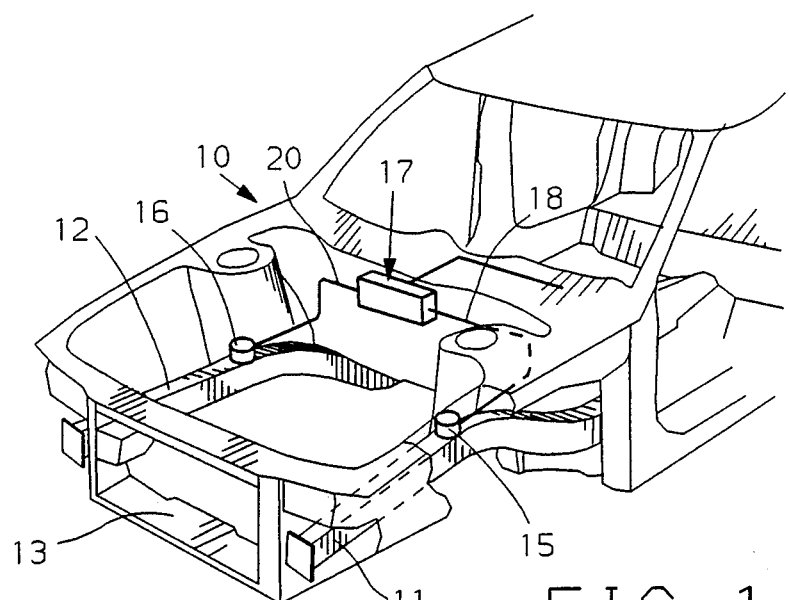
FIG. 1 is a perspective view of a vehicle body having a crash sensing and occupant restraint activating apparatus according to this invention.

Referring to FIG. 1, a vehicle body 10 comprises left side rail 11 and right side rail 12 projecting back from the front of the vehicle past the front wheel wells, which are not shown. Body 10 is of unit body construction, in which the main body structural parts are welded together and thus communicate acoustic vibrations throughout the body, although there is, of course, some attenuation of the signal with distance from the acoustic source. A front cross structure 13 connects left and right side rails 11 and 12 and is capable of communicating acoustic vibrations to and from the side rails. Body 10 itself is typical of modern vehicle unit bodies and is thus not further described in detail.

In a frontal crash, deformation of the structure of body 10 generally begins near the front thereof, in cross structure 13 or the front of left side rail 11 or right side rail 12. This deformation causes acoustic emissions to emanate from the point of deformation throughout the body structure. In many cases, the deformation of energy absorbing units or bumpers which are attached to the front structure of the body but not an integral part thereof create acoustic emissions which are also transmitted through the body structure and which precede those emissions from deformation of the body structure itself. It has been found that two acoustic emission sensors are sufficient for detection of these acoustic emissions, regardless of where originated at the front of the vehicle. For the purposes of this description and the claims which follow, such parts as bumpers and energy absorbing units which are attached to the unit body sufficiently securely that acoustic emissions originating therein are transmitted to the body side rails are to be considered part of the body structure.

One such acoustic emission sensor 15 is attached to left side rail 11; and another acoustic emission sensor 16 is attached to right side rail 12. Each of sensors 15 and 16 is a piezoelectric or similar vibration sensor attached to its respective side rail to be excited by acoustic vibrations therein and generate an output electrical signal thereof. One such sensor known to work in such a system is a Dunegan ® S9208 broadband laboratory quality sensor. This sensor is too expensive for mass production use, but was useful in tests of the invention where more complete data are desired. The sensor wa used in tests with a standard Dunegan ® 1801 preamplifier with 100 KHz to 1 MHz bandpass filters installed to preserve the broadband output of the sensor while reducing low frequency signals which might saturate the desired signal. The broadband output would not be needed in a production system but, once again, was useful for complete test data.

Sensors 15 and 16 are located as closely as possible to the front of the side rails, so as to receive the acoustic vibrations from frontal crash deformation as quickly as possible with minimal attenuation. The location shown in FIG. 1 is about 700 mm back from the front of the side rails, adjacent the front wheel wells. This location is that chosen for tests, since it was sufficiently far back to preserve the expensive, laboratory grade sensors in crash testing. Even in this location, excellent results were obtained; however, even better results might be expected with a mounting closer to the front of the side rails. In a production version of the system, the sensors would probably be moved closer to the front of the side rails, since preservation of the sensors for a longer time than required to generate the crash signal would not be a high priority consideration.

Figure 2:
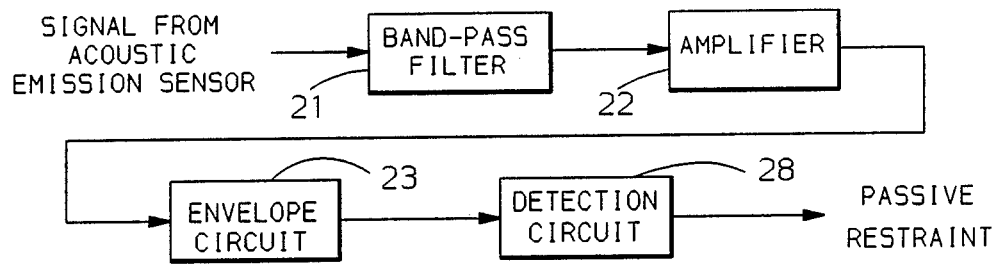
FIG. 2 is a block diagram of sensor signal processing apparatus for use in the apparatus of FIG. 1.

Each of sensors 15 and 16 is effective to generate an output voltage signal, which is communicated to signal processing apparatus 17, shown mounted on the vehicle firewall, through connecting wires 18 and 20, respectively. Signal processing apparatus 17 may be located in other parts of the vehicle, such as the passenger compartment, trunk, etc. with only a preamplifier closer to the sensors if required by long connecting wire. Signal processing apparatus 17 is shown in block diagram form in FIG. 2. In a preferred embodiment, such apparatus is provided for each of sensors 15 and 16; although the sensor signals might be combined into a single signal flow path in some systems. Only one circuit is shown in FIG. 3b; the other, if present, is essentially identical.

The signal from each of the acoustic emission sensors 15 and 16 is applied to a band-pass filter 21 having a pass band of 200 to 300 KHz with a rolloff of 48 dB/octave. Since this is the frequency range of interest, this frequency range would be all that is necessary in the sensors and amplifiers of a production version of this invention. The 200 to 300 KHz frequency range was chosen especially to exclude lower frequency components more typical of hammer blows to the body and other acoustic emission events in which no occupant restraint activation is desired.

Figure 3A:
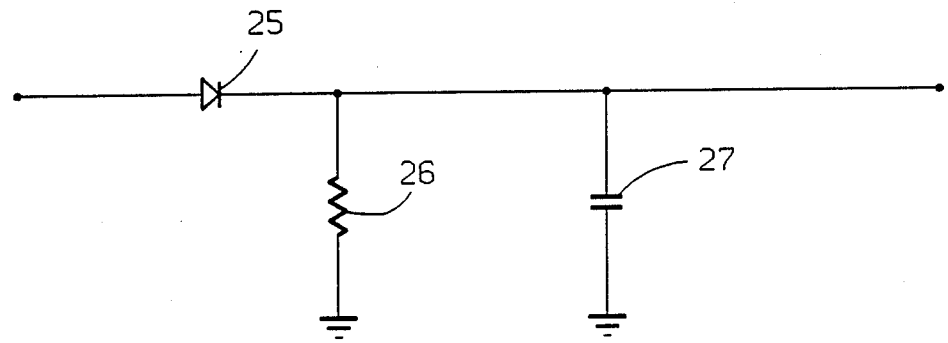
FIGS. 3a and 3b are circuit diagrams of portions of the sensor signal processing apparatus of FIG. 2.
Figure 3B:
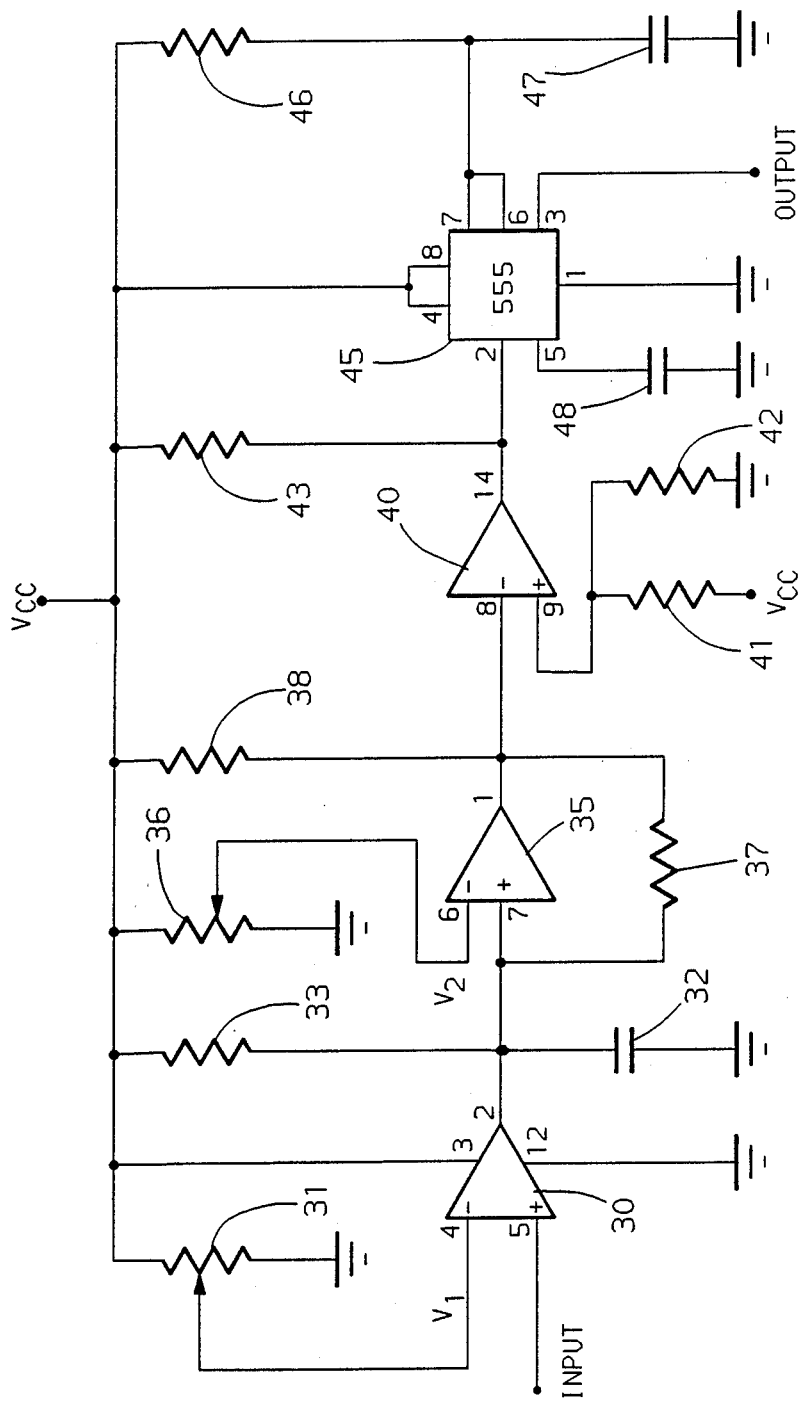

The filtered signal from band-pass filter 21 is amplified in amplifier 22 (about 30 dB amplification in this embodiment) and passed to an envelope circuit 23, which is of standard construction as shown in FIG. 3a. Envelope circuit 23 comprises a series diode 25 with a parallel combination to ground of a resistor 26 (10K) and capacitor 27 (0.22 uF), for an RC time constant of substantially 2 (2.2) milliseconds. The values of these components are chosen to provide an envelope of a signal in the 200 to 300 KHz frequency range which will provide a continuous envelope signal in spite of very short duration signal reductions or dropouts observed in some acoustic emission signals generated in crashes in which occupant restraint activation was required. It has been found empirically that such momentary dropouts or reductions sometimes occur, but that correct choice of the time constant in a standard envelope detector circuit creates envelope signals which can be reliably distinguished from those with longer dropouts or larger signal reductions in which occupant restraint activation is not required.

The envelope of the filtered and amplified sensor signal is provided from envelope circuit 23 to a detection circuit 28, which is described in detail with reference to FIG. 3b. The signal is input to detection circuit 28 to the non-inverting input of a comparator 30 (LM2901), the inverting input of which is provided with a predetermined amplitude reference voltage $V_1$ derived from a voltage divider 31 (10K potentiometer) connected across a supply voltage $V_{cc}$. Since comparator 30 is also connected across supply voltage $V_{cc}$, the output of comparator 30 is at ground potential until the input from envelope circuit 23 exceeds reference voltage $V_1$, whereupon its open collector output is freed from ground potential.

A capacitor 32 (2.2 uF) is connected from the output of comparator 30 to ground; and a resistor 33 (3K) is connected from the output of comparator 30 to $V_{cc}$. Therefore, the output of comparator 30 is either at ground potential (when the envelope circuit output is less than reference voltage $V_1$) or rising as capacitor 32 charges through resistor 33 (when the envelope output exceeds reference voltage $V_1$).

The output of comparator 30 is further connected to the non-inverting input of another comparator 35 (LM2901) having an inverting input provided with a reference voltage $V_2$ from a voltage divider 36 (10K potentiometer) connected across supply voltage $V_{cc}$. Comparator 35 is also connected across supply voltage $V_{cc}$. Resistor 37 (10M) provides positive feedback around comparator 35; and the output of comparator 35 is connected through a pull up resistor 38 (3K) to supply voltage $V_{cc}$.

The output of comparator 35 is further connected to the inverting input of a comparator 40 having a non-inverting input connected to the output of another voltage divider comprising a pair of resistors 41 (10K) and 42 (1K) connected from supply voltage $V_{cc}$ to ground. The output of comparator 40 is connected through a pull up resistor 43 to supply voltage B+. Comparator 40 operates as an inverter for the output of comparator 35, since it has an output that goes to $V_{cc}$ when the output of comparator 35 goes to ground and vice versa.

The output of comparator 40 is provided to the trigger input of a timer circuit 45 (555 timer chip) having threshold and discharge inputs connected through a resistor 46 (1 M) to supply voltage $V_{cc}$ and through a capacitor 47 (1 uF) to ground. The reset and $V_{cc}$ inputs of timer circuit 45 are connected to supply voltage B+; and the ground input is grounded. Pin 5 of timer chip 45 is connected to ground through a capacitor 48 (0.01 uF).

Figure 4A:
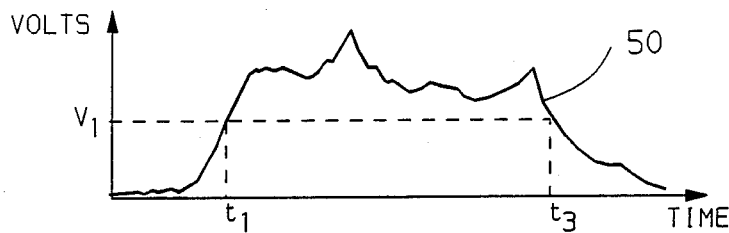
FIGS. 4a-4e are timing diagrams illustrating the operation of the sensor signal processing apparatus of FIG. 2.
Figure 4B:
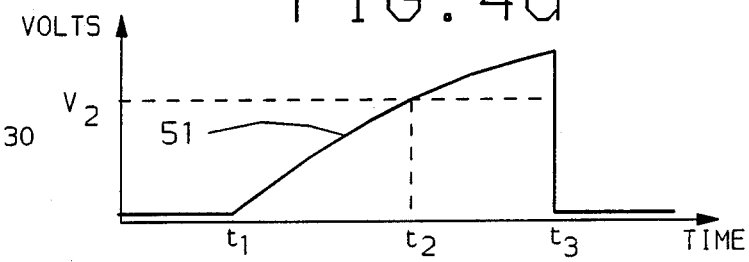
Figure 4C:
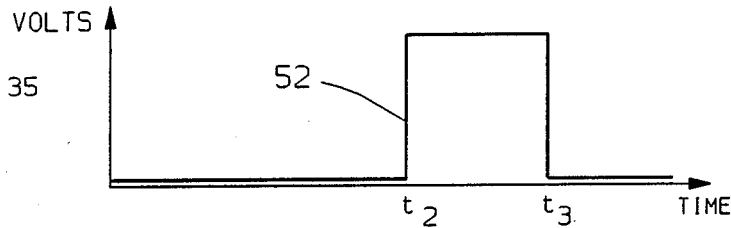
Figure 4D:
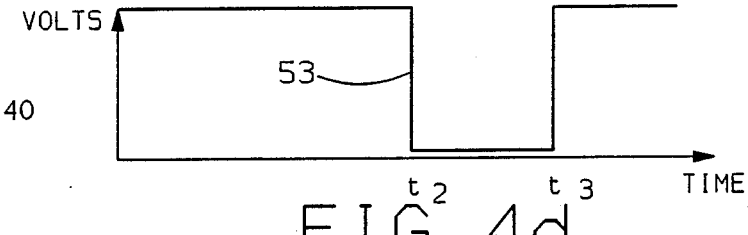
Figure 4E:
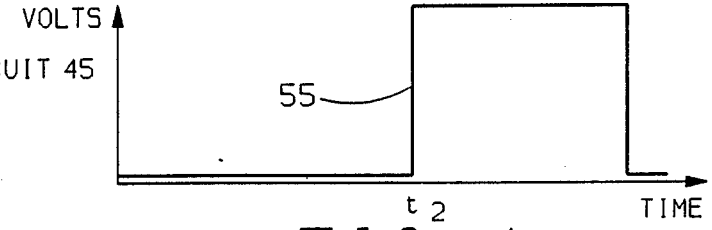
Figure 5A:
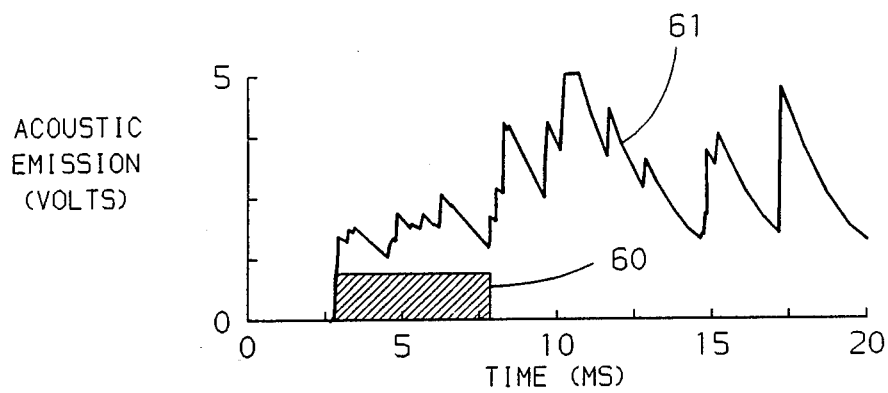
FIGS. 5a-5c are timing diagrams of the envelope of the filtered sensor signal for crash events causing occupant restraint activation in the apparatus of FIG. 1.
Figure 5B:
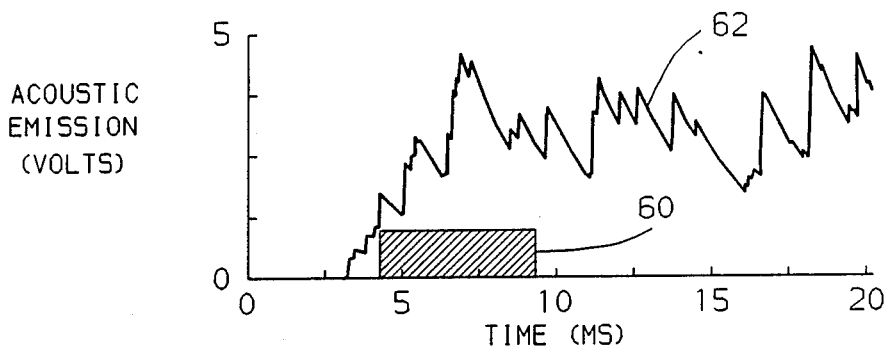
Figure 5C:
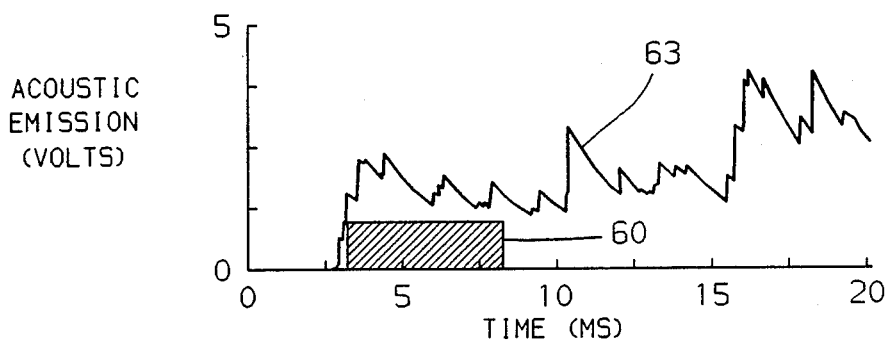

The operation of detection circuit 28 is described with reference to FIGS. 4a-4e. Curve 50 of FIG. 5a is the output of envelope circuit 23, and therefore the input to detection circuit 28, in response to a sensed acoustic emission event. Curve 51 is the output of comparator 30 in detection circuit 28. At first, the envelope voltage shown in curve 50 is less than reference voltage $V_1$; and the comparator output shown in curve 51 is held at ground. However, at time $t_1$, the input to detection circuit 28 exceeds voltage $V_1$. This starts a timer comprising capacitor 32 charging through resistor 33; and this charging is shown in the rising portion of curve 51 which starts at time $t_1$.

If the envelope of the filtered sensor signal drops below the predetermined amplitude reference, capacitor 32 will immediately discharge through the output transistor of comparator 30, with curve 51 dropping to ground. However, if it stays above the predetermined amplitude reference until the end of the 5 millisecond reference time period at time $t_2$, the requirement for activation of an occupant restraint, that the envelope must exceed a predetermined amplitude reference for a predetermined time period, will have been met. Curve 52 of FIG. 4c represents the output of comparator 35, which is at ground until the voltage represented by curve 51, which voltage is also the input to comparator 35, exceeds reference voltage $V_2$. At this point, curve 52 rises to supply voltage B+. This is the signal for occupant restraint activation.

In this circuit, additional comparator 40 and timer circuit 45 do not modify the detecting action of the circuit, but are provided as a particular output circuit. Timer circuit 45 provides an output pulse of ensured minimum duration for the occupant restraint activation signal; and comparator 40 inverts the output of comparator to provide a falling signal required to trigger the 555 timer chip. Curve 53 represents the voltage output of comparator 40, which is seen to be the inverse of the output of comparator 35. Curve 55 represents the output of timer circuit 45, which goes high at time $t_2$ along with curve 53 but falls at a later time determined by its own circuit arrangement. The circuit details and operation of timer chip 555 and its related components are not described in further detail, since they are well known to circuit designers and, regardless, are not important to this invention.

The action of the apparatus in response to various inputs can be seen in the timing diagrams of FIGS. 5a-5c and 6a-6c. The shaded box in each Figure has a height equal to the predetermined amplitude reference for occupant restraint activation and a length equal to the corresponding 5 millisecond time duration which must be exceeded. Thus, for the occupant restraint to be triggered, the curve representing the envelope output must go over the box without entering it. FIG. 5a shows the result of a 48 kph (30 mph) barrier crash. Curve 61 of FIG. 5a rises immediately out of box 60 and remains out well beyond the full 5 milliseconds. The occupant restraint will be activated. The same is true for curve 62, which represents a 48 kph 30 degree left angle barrier crash, and curve 63, which represents a 48 kph fixed pole crash at the center front of the vehicle. It can be seen that the acoustic emissions from such events last far longer than the 5 millisecond reference time period.

Figure 6A:
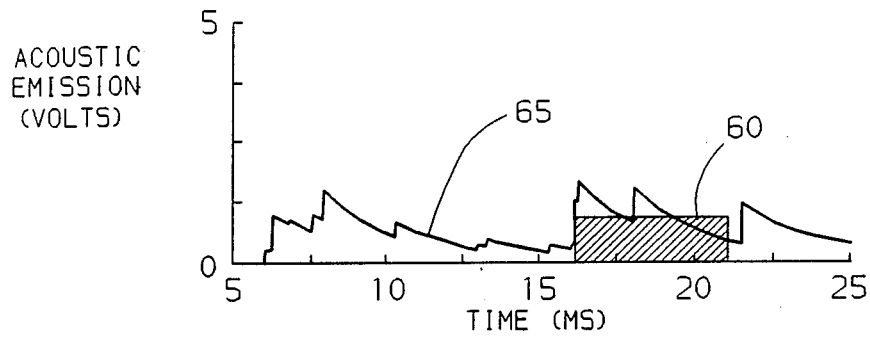
FIGS. 6a-6c are timing diagrams of the envelope of the filtered sensor signal for acoustic emission events not causing occupant restraint activation in the apparatus of FIG. 1.
Figure 6B:
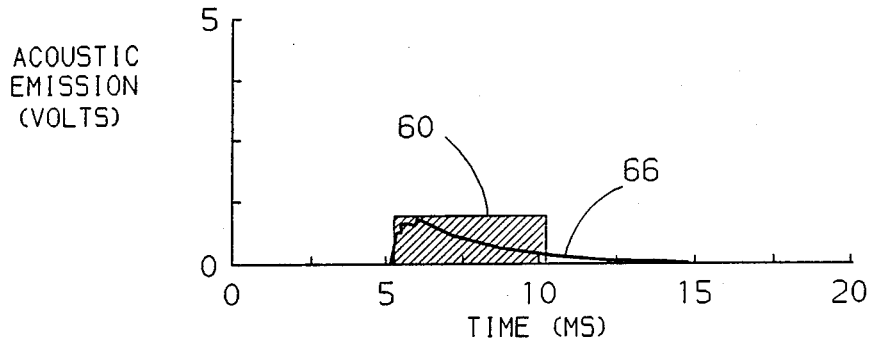
Figure 6C:
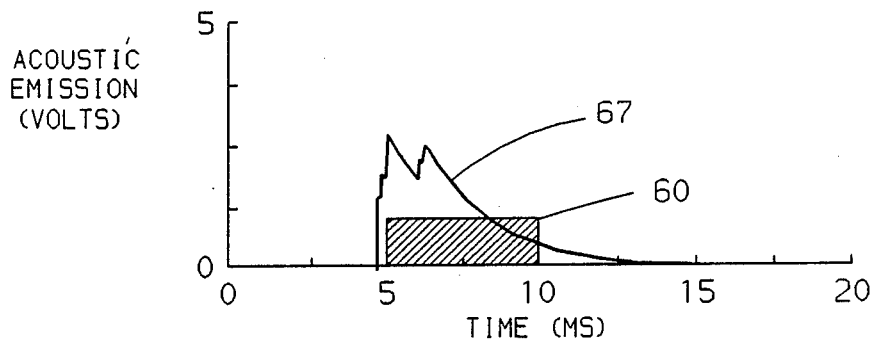

Curve 65 of FIG. 6a shows the result of an 80 kph (50 mph) simulated deer collision. The acoustic emissions are long lasting and occasionally exceed the amplitude reference but never stay above the amplitude reference for the full 5 milliseconds. Curve 66 shows the result for a severe pot hole at 56 kph (35 mph), in which the signal just about reaches the amplitude reference but immediately decays. Curve 67 shows the result for a hammer blow, through a center punch to magnify its effect, directly on the side rail near one of the sensors. Although it easily exceeds the amplitude reference, it decays quickly. None of curves 65-67 result in activation of the occupant restraint, even though they are severe examples of the events causing the acoustic emissions. It can be seen, by comparing the results of the occupant restraint activating events illustrated in FIGS. 5a-5c with those in 6a-6c which do not activate the occupant restraint, that the gains of the system and the amplitude reference $V_1$ can be adjusted so as to distinguish between the former and the latter.

The embodiments of the invention in which an exclusive property or privilege is claimed are defined as follows:

1. In combination with a vehicle having a welded unit body structure including a pair of frame side rails, one on each side of the vehicle extending longitudinally back from the front of the body structure, the body structure further emitting an acoustic signal upon deformation thereof in a crash which is transmitted to at least one of the side rails, crash sensing and occupant restraint activating apparatus comprising, in combination:
   an acoustic sensor attached to each side rail near the front thereof;
   a bandpass filter effective to pass a signal from either acoustic sensor in a predetermined high frequency range;
   an envelope detector responsive to the bandpass filter to derive an envelope of filtered signals therefrom, the envelope detector having a predetermined time constant;
   comparator/timer means effective to compare the output of the envelope detector with a predetermined amplitude reference and generate a crash signal when the amplitude reference is exceeded for a predetermined minimum time; and
   means responsive to the crash signal for activating an occupant restraint.

2. The crash sensing and occupant restraint activating apparatus of claim 1 in which the predetermined minimum time is substantially 5 milliseconds.

3. The crash sensing and occupant restraint activating apparatus of claim 1 in which the envelope detector has a time constant of substantially 2 milliseconds.

4. The crash sensing and occupant restraint activating apparatus of claim 1 in which the predetermined high frequency range is substantially 200 to 300 KHz.

5. The crash sensing and occupant restraint activating apparatus of claim 2 in which the envelope detector has a time constant of substantially 2 milliseconds.

6. The crash sensing and occupant restraint activating apparatus of claim 2 in which the predetermined high frequency range is substantially 200 to 300 KHz.

7. The crash sensing and occupant restraint activating apparatus of claim 3 in which the predetermined high frequency range is substantially 200 to 300 KHz.

8. The crash sensing and occupant restraint activating apparatus of claim 5 in which the predetermined high frequency range is substantially 200 to 300 KHz.

* * * * *